United States Patent
Snelgrove et al.

(10) Patent No.: US 7,050,757 B2
(45) Date of Patent: May 23, 2006

(54) SUBSCRIBER STATIONS

(75) Inventors: Martin Snelgrove, Toronto (CA);
Michael Stumm, Toronto (CA); Trevor Moat, Toronto (CA)

(73) Assignee: SOMA Networks, Inc., San Francisco, CA (US)

( * ) Notice: Subject to any disclaimer, the term of this patent is extended or adjusted under 35 U.S.C. 154(b) by 397 days.

(21) Appl. No.: 10/234,717

(22) Filed: Sep. 5, 2002

(65) Prior Publication Data

US 2003/0045229 A1 Mar. 6, 2003

(30) Foreign Application Priority Data

Sep. 5, 2001 (CA) .................................. 2356714

(51) Int. Cl.
*H04H 1/00* (2006.01)
*H04M 11/00* (2006.01)
*H04B 1/38* (2006.01)

(52) U.S. Cl. ..................... 455/3.05; 455/403; 455/557

(58) Field of Classification Search ............. 455/554.1, 455/554.2, 3.05, 557, 403; 340/539.1, 506, 340/539.11; 379/43, 49, 39, 40, 106.01
See application file for complete search history.

(56) References Cited

U.S. PATENT DOCUMENTS

| | | | |
|---|---|---|---|
| 6,188,912 B1 * | 2/2001 | Struhsaker et al. | 455/561 |
| 6,564,051 B1 * | 5/2003 | Struhsaker et al. | 455/423 |
| 6,701,152 B1 * | 3/2004 | Cohen et al. | 455/453 |
| 6,741,870 B1 * | 5/2004 | Holmstrom et al. | 455/557 |
| 6,792,286 B1 * | 9/2004 | Bharath et al. | 455/554.2 |
| 6,823,197 B1 * | 11/2004 | Chen et al. | 455/554.1 |
| 2002/0098799 A1 * | 7/2002 | Struhsaker et al. | 455/3.05 |
| 2003/0083903 A1 * | 5/2003 | Myers | 705/2 |

* cited by examiner

*Primary Examiner*—Edan Orgad
*Assistant Examiner*—Michael Chu
(74) *Attorney, Agent, or Firm*—Katten, Muchin, Rosenman

(57) ABSTRACT

A subscriber station operable to communicate with a base station and provide telephony and data services to users. The subscriber station connects to telephony and data devices and preferably communicates with the base station using a wireless modem.

20 Claims, 2 Drawing Sheets

SUBSCRIBER STATIONS

FIELD OF THE INVENTION

The present invention relates to a system, apparatus and method of providing local loop telecommunications services, or the like. More specifically, the present invention relates to a subscriber station providing such services for both data and voice with a number of enhancements.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

In general, a subscriber station that is within the scope of the present invention provides telephony ports for at least two conventional telephones or facsimile machines and a data port for a digital networked device, such as a personal computer or information appliance. The telephony connection ports can be standard RJ-11 connectors or any other suitable connector/port as will occur to those of skill in the art. The data port can be an RJ-45 Ethernet port, or any other suitable connector/port for interfacing to digital network-enabled devices as will occur to those of skill in the art. As will be apparent to those of skill in the art, other types and/or combinations of ports can be provided as desired.

Figure 1:
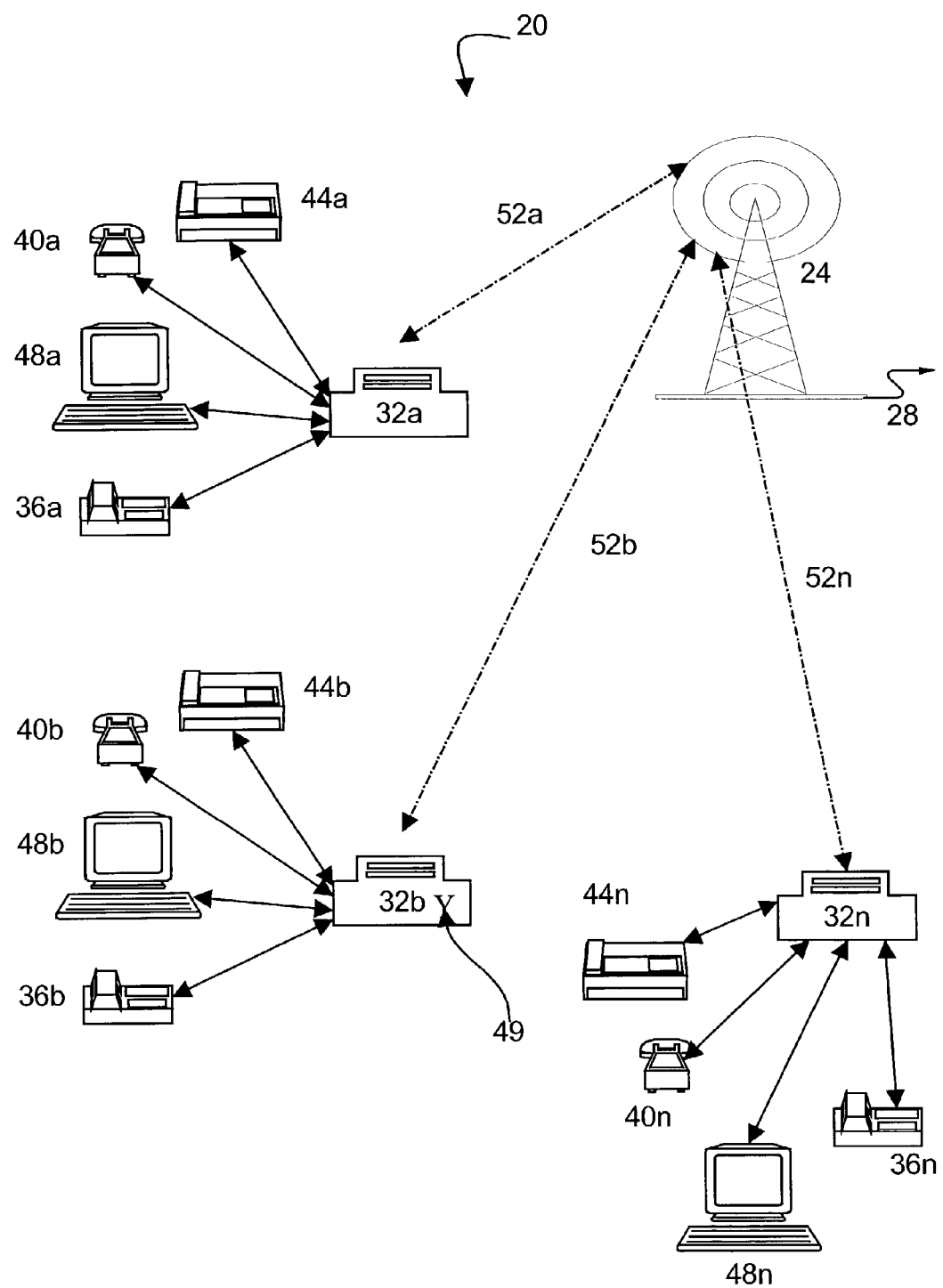
FIG. 1 shows a schematic representation of a wireless local loop ("WLL") system in which a subscriber station in accordance with the present invention may be used.

More specifically, a WLL system in which an embodiment of the present invention may be used is indicated generally by reference numeral 20 in FIG. 1. System 20 includes a radio base station 24 which is preferably connected to voice and/or data telecommunications network (not shown), such as a land line-based switched telephone network and/or data network, by one or more backhauls 28. A backhaul 28 can be a T1, T3, E1, E3, OC3 or other suitable landline link, or can be a satellite or other radio or microwave channel link or any other link suitable for operation as a backhaul as will occur to those of skill in the art.

Base station 24 communicates with a plurality of subscriber stations 32 which are installed at subscriber premises. Depending upon the amount of radio resources (spectrum, transmission power, etc.) available, the multiple access technique employed (FDMA, TDMA, CDMA, etc.) and/or the configuration and requirements of the subscriber stations 32, it is contemplated that 'n' subscriber stations, where n is one hundred or more, can be serviced by a base station 24.

In the illustrated WLL, each subscriber station 32 provides telephony ports for two conventional telephones 36,40, a telephony port for a facsimile machine 44 and a data port for a digital networked device, such as a personal computer or information appliance 48. The telephony connection ports, which are described further below, can be standard RJ-11 connectors or any other suitable connector/port as will occur to those of skill in the art. The data port can be an RJ-45 Ethernet port, or any other suitable connector/port for interfacing to digital network-enabled devices as will occur to those of skill in the art. As will be apparent to those of skill in the art, other types and/or combinations of ports can be provided as desired. For example, it is contemplated that in some circumstances a radio, compatible with the emerging 'Bluetooth' or IEEE 802.11 standards will be included in some subscriber stations 32 as a wireless media port 49 (for subscriber station 32b) to allow wireless communications between subscriber stations 32 and appropriately enabled devices in their vicinity. It is also contemplated that wireless media ports 49 providing communication via Infrared or other wireless media to appropriately enabled devices can be provided.

Communications channels 52 are established between base station 24 and each subscriber station 32. Channels 52 allow data (voice data representing digitized voice conversations or "pure" data representing email, html documents, streaming video, etc.) to be transferred between base station 24 and respective subscriber stations 32, preferably in packets, as needed. The implementation/type of packet communication employed is not particularly limited, and can include IP (with TCP or UDP) and/or modifications thereof or any other packet implementation as will occur to those of skill in the art.

The radio resources for channels 52 is shared between base station 24 and all subscriber stations 32 in the reception footprint of that base station 24 or, in the case of a multi-sector base station 24 described below, in the reception footprint of the corresponding sector of a base station 24. Channels 52 can be formed on the shared bandwidth via any suitable multiple access technique, such as CDMA, OFDM, TDMA or FDMA, as will be apparent to those of skill in the art and/or by packetization of the information to be sent between base station 24 and subscriber stations 32. As used herein, the term "radio resources" comprises all of the factors that limit the sharing of a radio channel by multiple subscriber stations. Radio resources include the amount of spectrum allocated for use by system 20, which can be shared under multiple access techniques as frequency bands, time slots, channels coded with Walsh or Gold codes or the like, and can also include the amount of power used to transmit a radio signal, which is typically limited by the license to the radio spectrum and/or by resulting interference (in CDMA or similar multiple access systems).

As is known, a base station can operate with multiple sectors, defined by directional antennas, each sector comprising a different reception footprint and this allows reuse of available radio spectrum between sectors. By using antennas with 60° broadcast angles, six sectors can be employed at a base station. Similarly, by using antennas with 180° broadcast angles, two sectors can be employed at a base station, or antennas with different broadcast angles can be combined as desired to form sectors of different angles. Base stations 24 with a variety of numbers of sectors, as needed for a distribution and/or number of subscribers, are contemplated herein.

While it is generally assumed that the amount of radio resources within any reception footprint is fixed and yields a given data transmission capacity, the available data transmission capacity can vary between downstream (base station 24 to subscriber station 32) and upstream (subscriber station 32 to base station 24) directions. In CDMA multiple access-based methods, interference between signals from multiple users broadcasting upstream can reduce the aggregate upstream data rates from the higher data rates that can be obtained in the downstream direction, and the reduced power levels employed for users to transmit upstream generally limits the upstream peak data rates in all multiple access methods.

The available data transmission capacity can be allocated as desired, in either direction, to various channels 52. Thus, for example, at one time period system 20 can provide a significant proportion of the total upstream data capacity to channel 52a and almost no upstream data capacity to channels 52b through 52n, to meet a high data transmission requirement of subscriber station 32a, while equally dividing downstream data capacity between all channels 52. At a subsequent time, when the specific need of subscriber station 32a has been addressed, system 20 can allocate upstream and downstream data capacity between channels 52a through 52n on a more equal, or other, basis.

Figure 2:
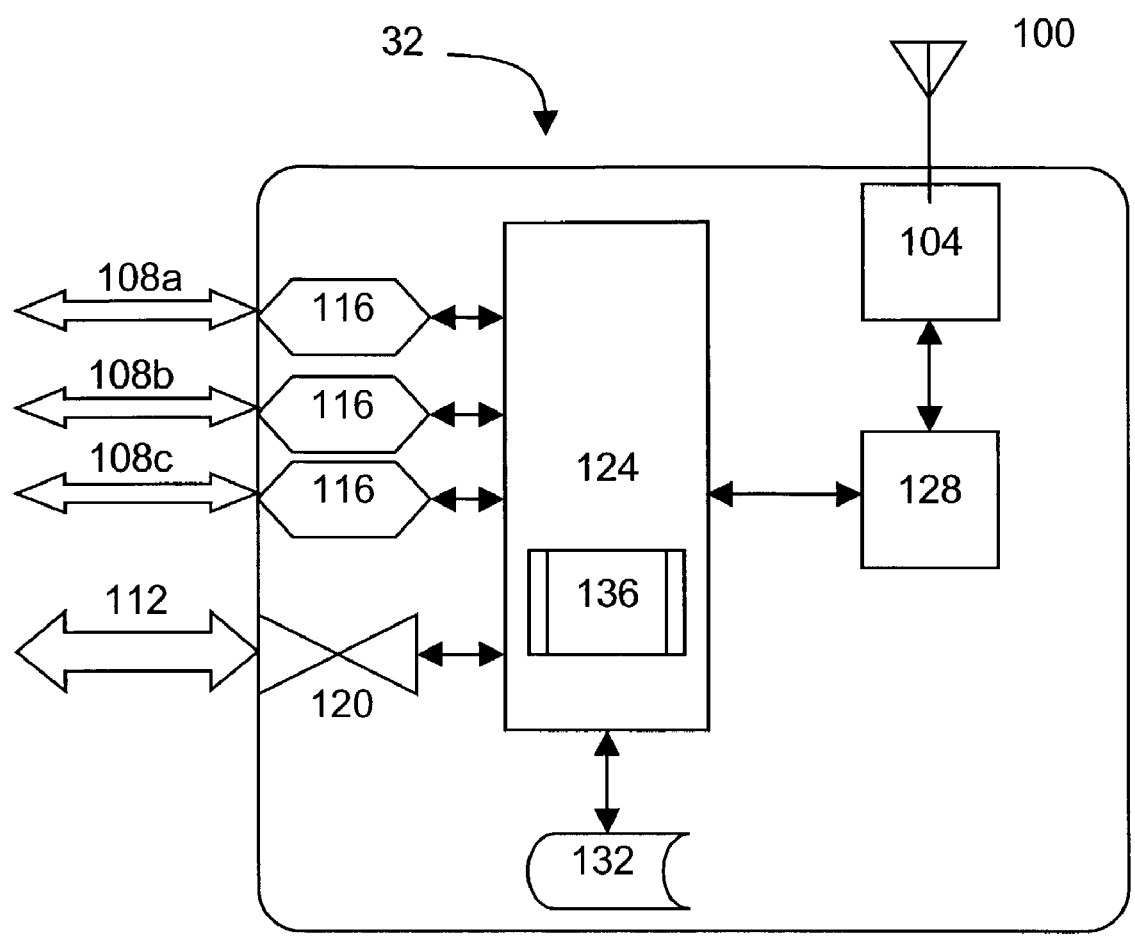
FIG. 2 shows a schematic representation of a subscriber station in accordance with the present invention.

FIG. 2 shows an embodiment of a subscriber station 32 in more detail. Subscriber station 32 includes at least one antenna 100 and a radio unit 104. As used herein, the term antenna is intended to comprise both single antennas and antenna assemblies, as will be apparent to those of skill in the art.

Subscriber station 32 also includes the above-mentioned telephony connection ports, identified in this Figure as ports 108a, 108b and 108c, for connecting conventional telephones and/or data devices which modulate data in the voice band (such as facsimile machines), respectively, and a data port 112. Each of telephony ports 108 is connected to a subscriber line interface circuit (SLIC) 116, such as an Am79R79 Ringing SLIC manufactured by AMD of One AMD Place, Sunnyvale, Calif., or any other suitable SLIC, which provides necessary signaling, voltage levels and other electrical requirements for such telephony connections. Data port 112 is connected to an Ethernet network interface controller (NIC) 120 or other suitable NIC as will occur to those of skill in the art. Each of SLICs 116 and NIC 120 are connected to a processor 124, such as the StrongARM microprocessor manufactured by Intel.

Processor 124 is also connected to a modulator/demodulator (modem) unit 128, which is constructed for use in radio systems, and modem 128 serves as an interface to radio unit 104. Modem 128 operates to: synchronize with transmitted signals; model radio propagation; select channels; and implement error-correcting codes and automatic repeat request and to generally implement suitable multiple access techniques (TDMA, FDMA, CDMA, OFDM, etc.) to establish communications channels 52 with one or more base stations 24.

In a present embodiment, radio unit 104 and modem 128 employ a wideband code-division multiple access technology, similar to that specified by the Third Generation Partnership Project (3GPP). Wideband CDMA is presently preferred, as the inventors believe it can increase the aggregate capacity of available bandwidth by exploiting the relatively stable fixed-access situation of a WLL. However, while CDMA technologies are presently preferred, it is also contemplated that technologies employing FDMA, TDMA, OFDM or other multiple access techniques, or combinations thereof, can also be employed if desired.

Processor 124 can also be connected to one or more digital signal processors (DSP) 132, such as a DSP from the AD 2100 family, manufactured by Analog Devices, Inc. of One Technology Way, Norwood Mass., USA. DSPs 132 assist in performing signal processing tasks, such as encryption, channel decoding, filtering, etc. While it is presently preferred that at least one DSP 132 be provided in subscriber stations 32, it is contemplated that this is not essential and that, especially as microprocessors available for use as processor 124 continue to advance in their capabilities and/or decrease in cost, processor 124 can perform all needed functions in some circumstances.

Processor 124 performs a variety of functions, in conjunction with DSP 132 (if present), including implementing suitable voice coders, filters, encoders, data compressors and/or decompressors, packet assembly/disassembly, etc. for each port 108 and port 112. Presently, one or more codecs (not shown), such as the AD73322 codec manufactured by Analog Devices, Inc. are employed with processor 124 for A/D and D/A conversion, performing band limiting and A-law dynamic range compression on voice connections. It is contemplated however, that these codecs can be eliminated, depending upon whether DSP 132 is present and/or the capabilities of DSP 132 and/or processor 124, although suitable D/A and A/D conversion and other related functions will still have to be provided either separately or as an onboard function of processor 124 or DSP 132 (if present).

Processing functions are applied to the ports as appropriate. For example, if port 108c is identified to users as a facsimile-only connection, no voice compression coding will be performed on data received from that port. Similarly, no voice coding will be performed on data port 112, but data compression or other compression techniques can be performed on data received at this port and/or from a dedicated facsimile port such as 108c.

Alternatively, each of telephony ports 108 can employ suitable techniques for determining the type of equipment connected to them. For example, ports 108 can employ the known technique of monitoring a connection for the 2100 Hz tone, which is transmitted by modems (such as those used in facsimile machines) when a connection is established. Upon detection of this tone, voice compression coding can be discontinued for the port and/or the connection characteristics altered accordingly, as described below.

If a wireless media port 49 is provided, data received at or transmitted from such a port is also processed accordingly.

In this manner, voice information to and from telephony ports 108 is converted to and from digital form and data from data port 112 and ports 108 is processed and packets assembled for transmission by subscriber station 32, as required. Similarly, processor 124 will operate on packets received at subscriber station 32 from a base station 24 and will disassemble the received packets, process them as appropriate and supply them to the appropriate port or ports 108, 112 or 49.

Processor 124, modem 128 and radio 104 handle all connections between subscriber station 32 and base station 24. Thus, if sufficient radio resources are available (as discussed below) each port 108 and port 112 can have a simultaneous connection to base station 24 and each of these connections can have different characteristics such as QoS levels and/or data rates.

A more detailed description of the context in which subscriber stations may be used is provided in U.S. patent application Ser. No. 09/717,241, filed on Nov. 22, 2000, the entire contents of which are hereby incorporated by reference.

It is contemplated that the subscriber station 32 can be adapted for DSL or cable modem use. The radio modem 128 may replaced with a G.Lite or similar cable modem.

It is contemplated that a lower cost version of the subscriber station 32 without telephony features may be desirable. The data-only subscriber station lacks RJ-11 jacks and has reduced DSP capabilities. As a further possible cost-cutting measure, the subscriber station may contain less FLASH memory.

It is contemplated that a subscriber station 32 could connect via a serial/USB/Bluetooth interface to a PDA (such as a PalmPilot®). Software would integrate the PDA's contact manager software with the functions of the subscriber station 32. Users can use the PDA to dial telephone calls. The PDA can also be used to set up three-way calls, create distribution lists, configure voice mail or other telephone preferences, etc.

The subscriber station 32 can also transmit information to the PDA. For example, caller ID information can be transmitted and displayed on the PDA screen.

It is further contemplated that the user can carry his or her subscriber station preferences and user agent as a file stored in the PDA. When the PDA is attached to a different subscriber station 32, the new terminal assumes all these features. Call-forwarding could be handled in this way, as calls are automatically forwarded to the subscriber station 32 with the PDA docked in it. Software agents within the subscriber station 32 would communicate with the base station 24 as to automatically forward calls to the correct subscriber station.

It is contemplated that the subscriber station 32 could be part of a distributed media delivery system. The subscriber station 32 would add a large (10+ Gig) hard drive built into the unit. Media files (mp3, mpeg, divx, etc) can be downloaded and stored in the subscriber station 32. A software scheduler would download files during non-peak times (as part of a subscription service).

The base station 24 could also provide mirroring services of the media files being stored on the subscriber station 32. The mirroring service would reduce the uploads from the subscriber stations 32 using peer-to-peer networking (such as Gnutella or Napster). For downloads, media files could be multicast from the base station 24 as to further reduce bandwidth demands It is contemplated that a stripped-down, low-cost version of the subscriber station 32 could be connected to a utility device (water meter, electricity meter, etc.). A small terminal wired into each utility meter would be connected (by wireless or wireline link) to the subscriber station 32. The subscriber station 32 would poll each terminal periodically and log pertinent information before passing it on to a customer service and billing database in the PSTN.

The utility device could also be connected to a home burglar or fire alarm system.

It is contemplated that the subscriber station 32 could act as an Emergency Advisor usable by the proper civil authorities. Multicast messages could be transmitted from base stations to the subscriber stations. A prerecorded message could ring the phones/played on speaker phones.

It is further contemplated that a subscriber station Extension Module (SEM) would bring PBX-like functions into the subscriber station 32. The SEM multiplexes up to 32 local RJ-11's to the 4 existing external lines, and acts as a local ethernet hub. The module is a box with its own power supply, and it attaches to the subscriber station 32 through a simple serial interface and standard ethernet-cable. It has one or more banks of RJ-11 and Ethernet terminals.

It is further contemplated that a subscriber station 32 can be integrated with a telephone handset (preferably cordless). The telephone handset transmits to the base station on a conventional cordless telephone frequency (such as 900 MHz).

It is further contemplated that a subscriber station 32 could connect into an existing wireline telephone network. The subscriber station 32 uses the landline connection for local calls/modem connections. The wireless interface is used for long distance or specialty calls/broadband connection. Users could define which services use which network (landline or wireless).

It is contemplated that a subscriber station 32 with speaker(s) built into it and a microphone could provide enhanced conference calling. Alternatively, instead of using an integrated speaker and microphone, the subscriber station 32 could be connected to a home computer with speaker or microphone. Many computers now come with 4.1 or 5.1 surround sound capabilities.

Furthermore, conference calls occur in stereo. Depending on when the caller connects to the conference call, they can be assigned a virtual 'position' to the left or right. The intent is to reproduce the audio characteristics of participants sitting around a table. When someone hears another participant, digital filters adjust the sound as to make the speaker sound to the left or right of the person listening.

It is further contemplated that a subscriber station 32 could be integrated with a digital satellite system. Preferably, the subscriber station antenna 100 would be integrated with the satellite dish casing. Software would integrate the features of the two devices so that the strengths of both units are combined.

Combining the two units would allow satellite TV providers to offer data and telephony services. These services would use the subscriber station wireless antenna. Additionally, the subscriber station could provide security and authentication capabilities to the satellite dish to prevent unauthorized device cloning. Authentication keys could also be transmitted across the wireless interface to the specific device. The subscriber station 32 could also provide the transport mechanism for interactive TV, or for ordering pay-per-view services. The satellite dish would be used primarily for the reception of digital media (video and audio).

In rural areas where it is not economically viable to deploy wireless base stations, the satellite dish could handle all transmissions.

It is contemplated that the subscriber station technology could be adapted for a computer laptop. A PCMCIA card containing a miniaturized version of the subscriber station modem would be inserted into one of the PCMCIA slots of the laptop. An external antenna would connect to the card. The laptop card would use many of the resources (hard drive, CPU) of the laptop in order to minimize the size and expense of the card.

It is contemplated that the subscriber station technology could be adapted for a computer PC. A PCI card containing a miniaturized version of the subscriber station modem would be inserted into one of the PCI slots of the PC. An external antenna would connect to the card (possibly through a USB port). The PC card would use many of the resources (hard drive, CPU) of the PC in order to minimize the size and expense of the card.

It is contemplated that the subscriber station technology could be adapted for use in a public information kiosk/payphone. A subscriber station 32 with a display screen, and input means (such as a keyboard) and a computer are built into a ruggedized and fixed casing. The unit is placed in public places. The kiosk possesses all the functionality of a public telephone combined with an Internet browser.

It is further contemplated that a subscriber station 32 could be the center of a home network. The home network could be deployed several ways. A subscriber station could provide multiple RJ-45 jacks and act as a network hub. Alternatively, the subscriber station could be enabled to use a wireless networking protocol such as 802.11 or Bluetooth. Another alternative would be to use a wireline networking protocol such as X.10.

It is contemplated that the functionality of the subscriber station 32 could be extended through the use of peripheral devices. Most of these devices would connect to the subscriber station through a USB port.

Examples of peripherals that could connect to the subscriber station 32 include:

Biometric security devices, voice authentication or other authentication tools. These devices could be used to enhance commercial transactions taking place over the Internet.

A web camera

A bar-code reader

Speakers

An LCD screen, used for call display, as an aid to configure the device, etc.

An MPEG decoder

Interfaces for X.10, 802.11, Bluetooth, etc. to provide home networking services The above-described embodiments of the invention are intended to be examples of the present invention and alterations and modifications may be effected thereto by those of skill in their art, without departing from the scope of the invention, which is defined solely by the claims appended hereto.

We claim:

1. A subscriber station for a wireless local loop, comprising:
    a radio operably connected between a modem and an antenna; and
    a processor operably connected between said modem and at least one telephony port and at least one data port, said processor communicating with a base station via said radio to manage at least the allocation of data transmission capacity for a connection between said base station and at least one of said ports,
    wherein the subscriber station is configured to be connected to a utility metering device and is configurable to poll said device periodically and log pertinent data before passing such data on to a customer service and billing database in a public switched telephone network (PSTN), and
    wherein the subscriber station is configured to be connected to a home burglar or fire alarm system and is configurable to report pertinent data to the PSTN.

2. The subscriber station as claimed in claim 1 wherein the subscriber station is connectable to a PDA and is configured so as to integrate the PDA's contact manager software with the functions of the subscriber station.

3. The subscriber station as claimed in claim 2 wherein the subscriber station is connectable to a PDA and is configured to transmit information to a connected PDA for display.

4. The subscriber station as claimed in claim 3 wherein a user's subscriber station preferences and user agent may be stored as a file stored in a connected PDA so that calls are automatically forwarded to the subscriber station to which the PDA is connected.

5. The subscriber station as claimed in claim 1 wherein the subscriber station additionally comprises a large data storage device and the processor is configured to download media files at scheduled times.

6. The subscriber station as claimed in claim 1 wherein the subscriber station is configured to receive emergency multicast messages and ring connected telephones.

7. The subscriber station as claimed in claim 1 wherein the subscriber station is configured to connect to a module so as to provide PBX-like functions, the module providing multiplexed telephone services and a local Ethernet hub.

8. The subscriber station as claimed in claim 1 wherein the subscriber station is integrated with a cordless telephone handset.

9. The subscriber station as claimed in claim 1 wherein the subscriber station may be connected into an existing wireline telephone network so as to use the wireline connection for local calls/modem connections and the wireless interface for long distance or specialty calls/broadband connection.

10. The subscriber station as claimed in claim 1 wherein the subscriber station additionally comprises at least one integrated speaker and an integrated microphone so as to provide enhanced conference calling.

11. The subscriber station as claimed in claim 10 wherein the subscriber station includes at least two speakers and a digital filtering so as to provide a virtual position for conference call participants.

12. The subscriber station as claimed in claim 1 wherein the subscriber station is connectable to a home computer having at least one speaker so as to provide enhanced conference calling.

13. The subscriber station as claimed in claim 12 wherein the subscriber station provides digital filtering so as to provide a virtual position for conference call participants when connected to a home computer having at least two speakers.

14. The subscriber station as claimed in claim 1 wherein the subscriber station is integrated with a digital satellite system.

15. The subscriber station as claimed in claim 14 wherein the subscriber station antenna is integrated with the satellite dish casing.

16. The subscriber station as claimed in claim 1 wherein the modem is on a computer card, the antenna is an external antenna connected to the card, and when installed in a computer the computer acts as the processor.

17. The subscriber station as claimed in claim 1 wherein the subscriber station includes a display screen and an input device and is configured to provide functionality of a public telephone combined with an Internet browser.

18. The subscriber station as claimed in claim 1 wherein the subscriber station provides multiple RJ-45 jacks and is configured to act as a network hub.

19. The subscriber station as claimed in claim 1 wherein the subscriber station includes a short-range wireless interface and is configured to act as a wireless network hub.

20. The subscriber station as claimed in claim 1 wherein the subscriber station includes a USB port and is configured to connect to peripheral devices.

* * * * *